(12) United States Patent
Colonico

(10) Patent No.: US 7,470,122 B2
(45) Date of Patent: Dec. 30, 2008

(54) APPARATUS FOR REMOVING MELT FROM A MELT RESIDUE STAGNATION ZONE IN AN INJECTION MOLDING APPARATUS

(75) Inventor: Gino Colonico, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 1009 days.

(21) Appl. No.: 10/785,105

(22) Filed: Feb. 25, 2004

(65) Prior Publication Data
US 2004/0185135 A1 Sep. 23, 2004

Related U.S. Application Data

(60) Provisional application No. 60/449,413, filed on Feb. 25, 2003.

(51) Int. Cl.
*B29C 45/23* (2006.01)
(52) U.S. Cl. .................. 425/564; 425/566
(58) Field of Classification Search .............. 425/549, 425/562, 563, 564, 565, 566
See application file for complete search history.

(56) References Cited

U.S. PATENT DOCUMENTS

| | | | |
|---|---|---|---|
| 4,013,393 A | 3/1977 | Gellert | |
| 4,026,518 A | 5/1977 | Gellert | |
| 4,053,271 A | 10/1977 | Gellert | |
| 4,303,382 A | 12/1981 | Gellert | |
| 5,334,010 A | 8/1994 | Teng | |
| 5,545,028 A | 8/1996 | Hume et al. | |
| 5,614,233 A * | 3/1997 | Gellert | 425/549 |
| 5,683,731 A | 11/1997 | Deardurff et al. | |
| 5,795,600 A | 8/1998 | Rozema | |
| 6,309,208 B1 | 10/2001 | Kazmer et al. | |
| 6,361,300 B1 | 3/2002 | Kazmer et al. | |
| 6,524,093 B2 | 2/2003 | Bouti | |
| 6,679,697 B2 | 1/2004 | Bouti | |
| 6,752,618 B2 | 6/2004 | Dewar et al. | |
| 6,884,061 B2 | 4/2005 | Okamura et al. | |
| 2001/0022321 A1 | 9/2001 | Bouti | |

FOREIGN PATENT DOCUMENTS

| | | |
|---|---|---|
| CA | 2608257 Y | 3/2004 |
| CN | 2608257 Y | 3/2004 |
| DE | 19811466 A1 | 9/1999 |

* cited by examiner

*Primary Examiner*—Tim Heitbrink
(74) *Attorney, Agent, or Firm*—Ridout & Maybee LLP (57) ABSTRACT

A method and apparatus for removing melt from a stagnation zone in a melt conduit extending from a melt source to a mold cavity is provided. The stagnation zone may be created by the presence of a valve pin in the melt conduit for controlling melt flow therethrough. The apparatus includes a stagnation zone cleaner that is moveable through the stagnation zone for urging melt out of the stagnation zone.

26 Claims, 6 Drawing Sheets

APPARATUS FOR REMOVING MELT FROM A MELT RESIDUE STAGNATION ZONE IN AN INJECTION MOLDING APPARATUS

FIELD OF THE INVENTION

This invention relates to an injection molding method and apparatus, and more particularly to an injection molding method and apparatus in which melt is removed from a stagnation zone in a melt conduit of the injection molding apparatus.

BACKGROUND OF THE INVENTION

In a typical hot runner injection molding apparatuses melt flows from a melt source, through a runner manifold, through a set of heated nozzles that are arranged in parallel downstream from the runner manifold, and finally into a set of mold cavities that are positioned in a mold cavity block.

In some apparatuses, there are portions of the melt flow path where the melt loses pressure. Melt flows into these low pressure regions, and remains there due to the pressure gradient between the region and the melt flow path adjacent the region An example of where such regions can be present is in apparatuses where valve pins are positioned somewhere in the melt flow path for controlling the melt flow. The valve pins are fixed in position, whereas in other cases the valve pin is moveable. Depending on the configuration of the melt flow path relative to the valve pin the valve pin may shield a portion of the melt conduit from the melt flow creating a low pressure region behind the valve pin opposite to where the melt flow encounters the valve pin. As a result of the low pressure region, melt therein can be difficult to remove, which can cause contamination problems when the apparatus is changed over to operate with a new melt composition.

Accordingly, there is a need for a method and device for removing melt from the low pressure region.

SUMMARY OF THE INVENTION

In a first aspect of the present invention, there is provided an injection molding apparatus including a runner component and a stagnation zone cleaner. A melt conduit is defined at least in part by the runner component, wherein the runner component is positionable downstream from a melt source and upstream from a gate into a mold cavity defined in a mold block. The melt conduit has a stagnation zone therein. The stagnation zone cleaner is moveable through the stagnation zone to urge melt out of the stagnation zone. Urging melt out of the stagnation zone can be used to inhibit contamination of melt used in a subsequent injection molding campaign after a changeover to a new melt composition.

In a second aspect of the present invention, there is provided a method of removing melt from a stagnation zone in a melt conduit in an injection molding apparatus, comprising:

(a) providing a stagnation zone cleaner that is moveable through the stagnation zone;

(b) moving the stagnation zone cleaner through the stagnation zone in a direction that urges melt therein downstream; and (c) initiating melt to flow from upstream of the stagnation zone into the stagnation zone. Urging melt out of the stagnation zone can be used to inhibit contamination of melt used in a subsequent injection molding campaign after a changeover to a new melt composition.

In a third aspect, the present invention is directed to a An injection molding apparatus, including a manifold, a plurality of nozzles, a plurality of gating systems, and a plurality of stagnation zone cleaners. The manifold defines a plurality of runners. The plurality of runners are in fluid communication with cl manifold inlet. Each of the runners has an outlet. The manifold is positionable so that the manifold inlet is downstream from a melt source. Each runner includes a corner portion prior to each outlet. The corner portion is configured to convey the melt through a non-zero angle. Each runner includes an outlet portion that extends generally linearly between the corner portion and the outlet. Each nozzle includes a nozzle melt channel. Each nozzle melt channel is positioned downstream from the outlet portion of one of the runners and upstream from a gate into a mold cavity defined in a mold block. Each gating system includes a valve pin and a valve pin actuator. Each valve pin extends into the outlet portion of one of the runners and into the nozzle melt channel of one of the nozzles. The valve pin is movable between an open position wherein the valve pin is spaced from the gate, and a closed position wherein the valve pin prevents melt flow to the mold cavity. Each stagnation zone cleaner is movable independently of the valve pin, between a retracted position wherein the stagnation zone cleaner is retracted from the runner, and an advanced position wherein the stagnation zone cleaner extends into a portion of the runner shielded by the valve pin from melt flow upstream from the valve pin.

BRIEF DESCRIPTION OF THE DRAWINGS

For a better understanding of the present invention and to show more clearly how it may be carried into effect, reference will now be made by way of example to the accompanying drawings, in which.

DETAILED DESCRIPTION OF THE PREFERRED EMBODIMENTS OF THE INVENTION

Figure 1:
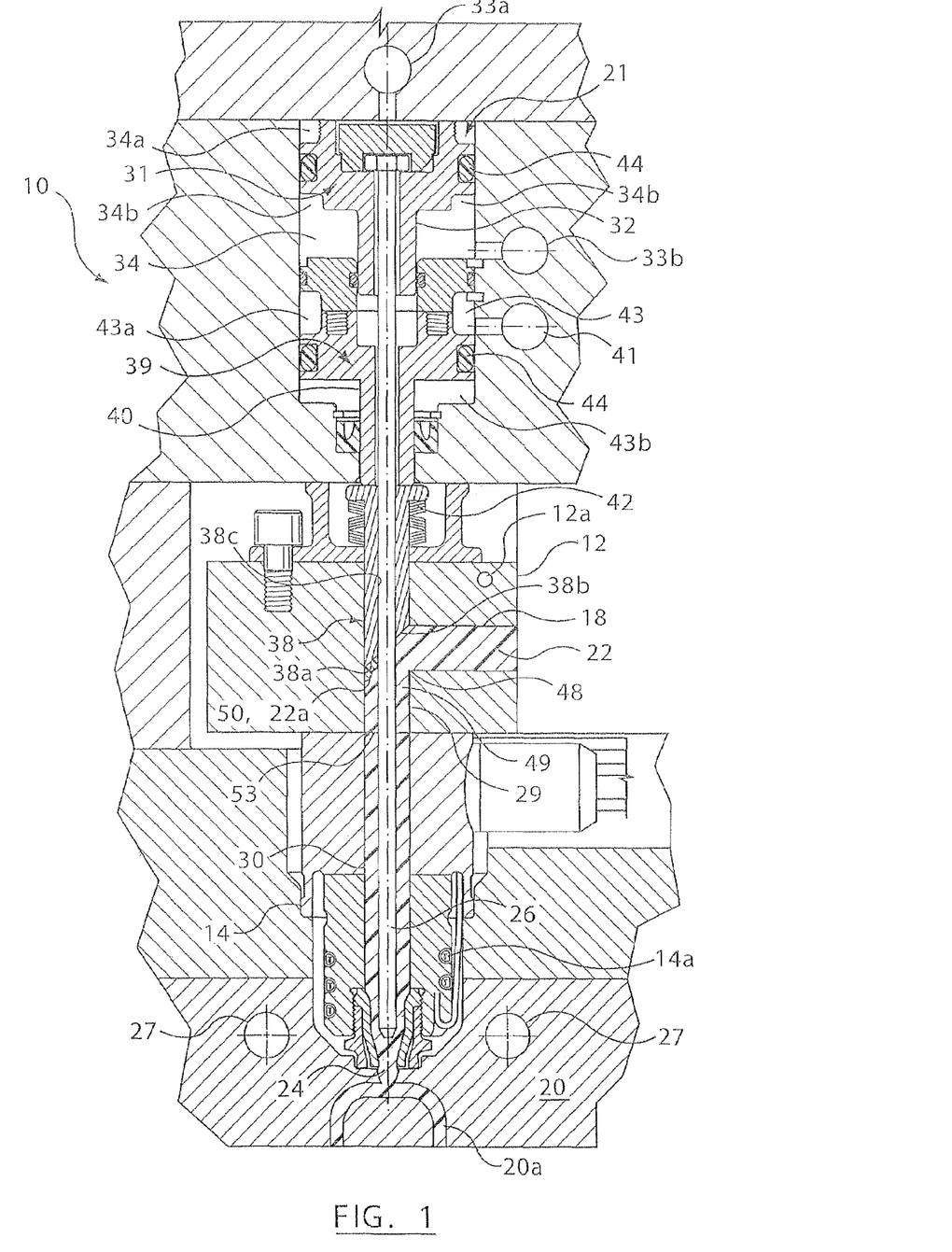
FIG. 1 is a side sectional view of a portion of an injection molding apparatus in accordance with a first embodiment of the present invention, in which a stagnation zone cleaner is in a retracted position and a gating system is in an open position.

Referring to FIG. 1, there is illustrated an injection molding apparatus 10 in accordance with the first embodiment of the invention. The injection molding apparatus 10 includes a runner component 12, a nozzle 14, a mold block 20 and may include a gating system 21. The runner component 12 defines a runner 18. The runner component 12 may be any component in which a runner 18 is present. For example, the runner component 12 may be a manifold which contains a plurality of runners 18 (see FIG. 6) in fluid communication with a manifold inlet 19.

The nozzle 14 defines a nozzle melt channel 30, which is downstream from the runner 12. The mold block 20 defines a mold cavity 20a, which has at least one gate 24 leading thereto.

Figure 2:
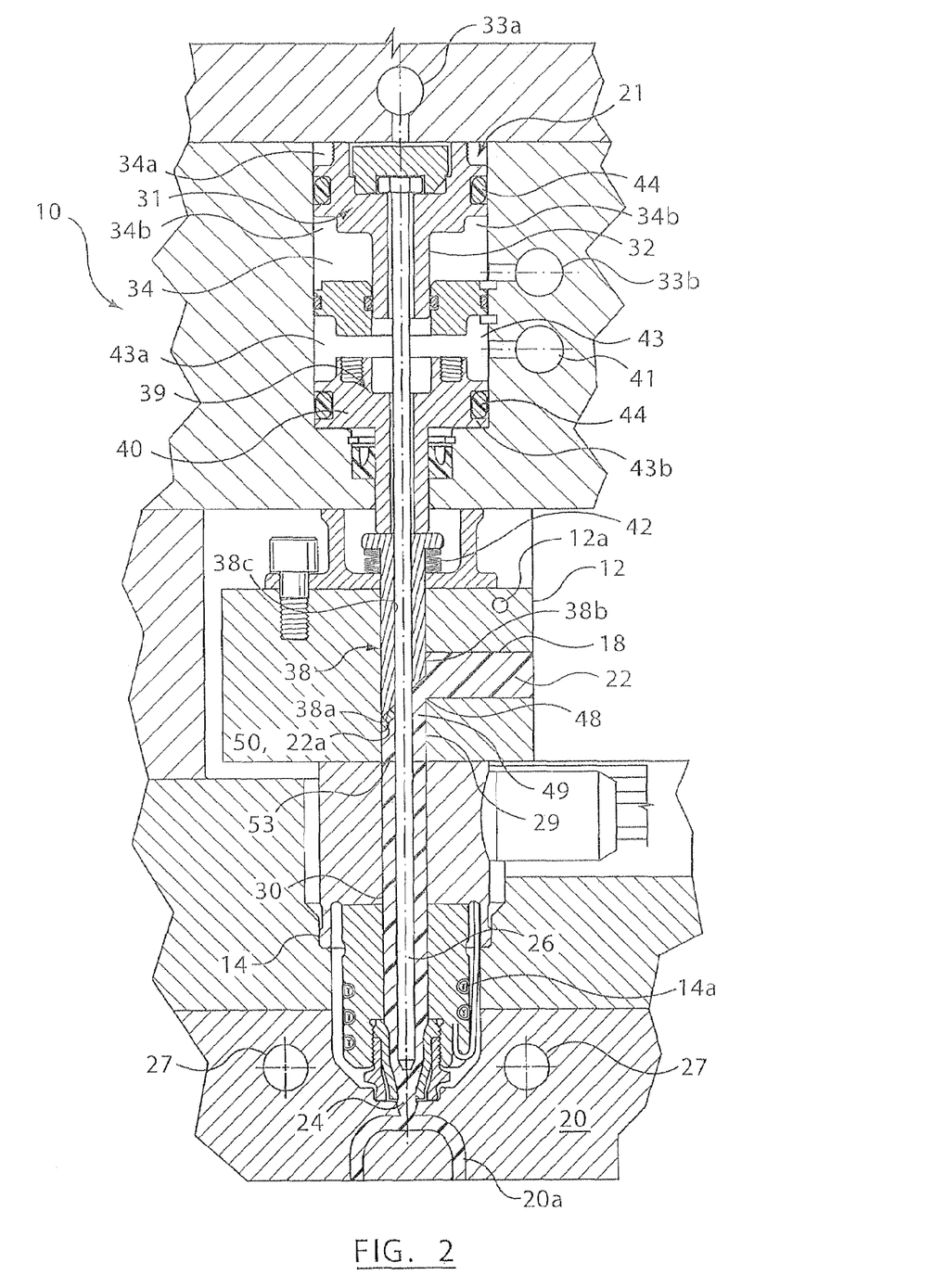
FIG. 2 is a side sectional view of the portion of the injection molding apparatus shown in FIG. 1, in which the stagnation zone cleaner has been advanced, and with the gating system in the open position.
Figure 3:
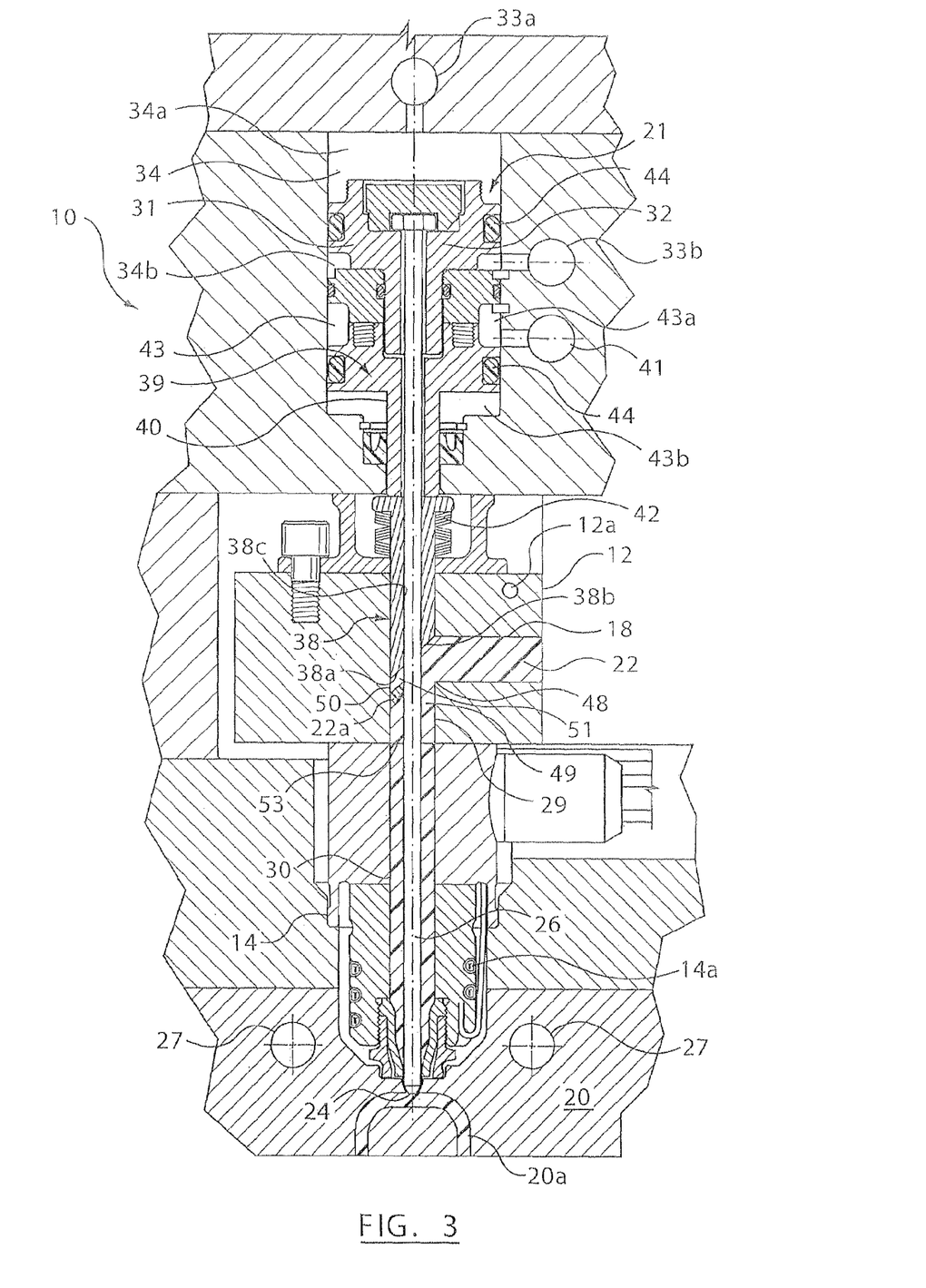
FIG. 3 is a side sectional view of the portion of the injection molding apparatus shown in FIG. 1, in which the gating system is in a closed position and the stagnation zone cleaner is in a retracted position.
Figure 6:
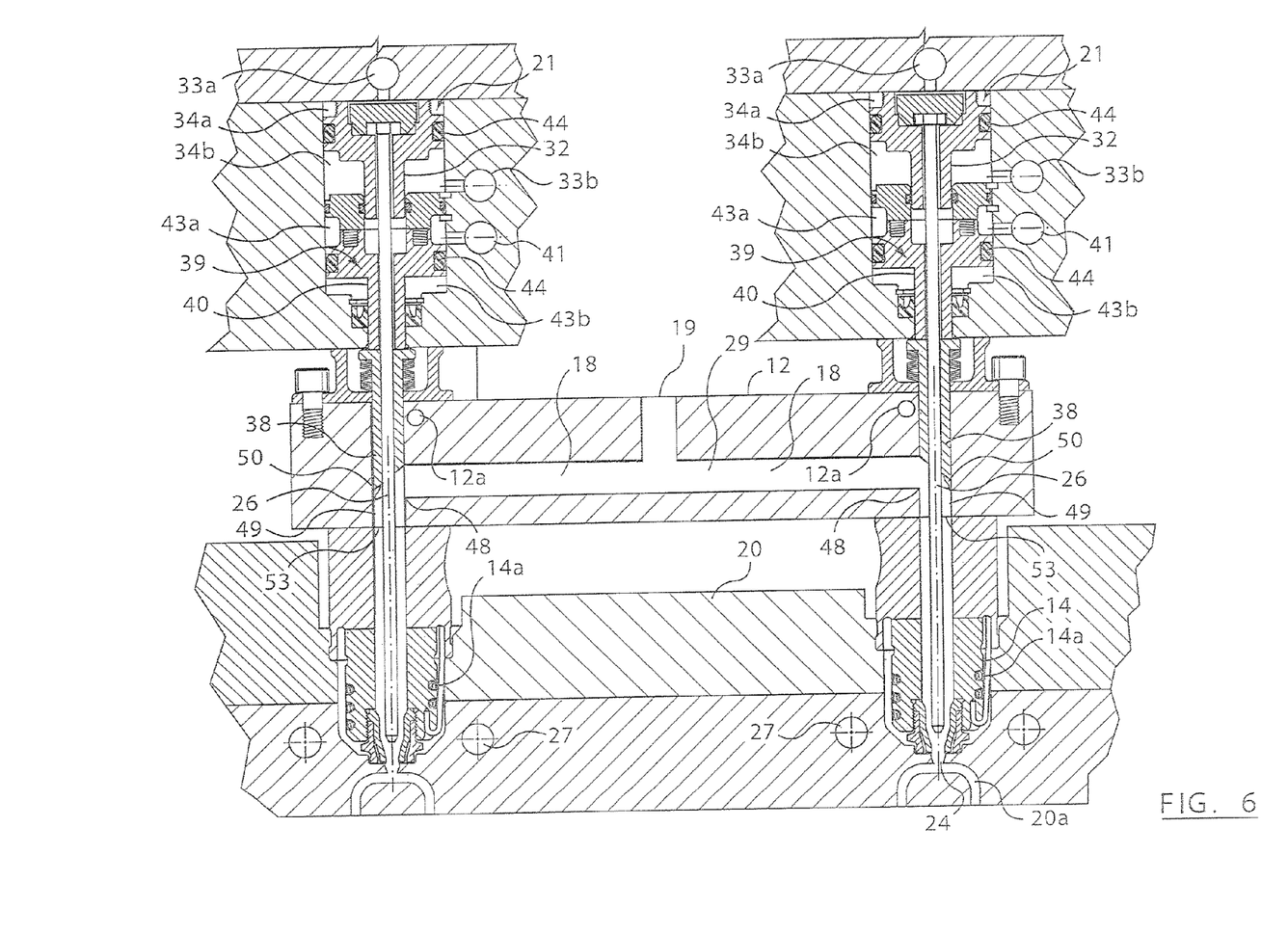
FIG. 6 is a side sectional view of the injection molding apparatus shown in FIG. 1.

The runner 18 and the nozzle melt channel 30 together define a melt conduit 29 that extends from the melt source (not shown) to the gate 24. The injection molding apparatus 10 may have a plurality of mold cavities 20a, a plurality of runners 18, a plurality of nozzles 14, and accordingly a plurality of melt conduits 29, as shown in FIG. 6. For clarity, only a single runner 18, nozzle 14, gate 24 and mold cavity 20a are shown in FIG. 1-3.

Melt 22 flows from a melt source (not shown) through the runner 18, through the nozzle melt channel 30, through the gate 24 and into the mold cavity 20a. The melt temperature is controlled in the runner component 12, the nozzle 14 and the mold 20 throughout the injection molding process. Specifically, a heater 12a may be provided in the runner component 12 for heating melt 22 in the runner 18. Furthermore, a heater 14a may be provided in the nozzle 14 for heating melt therein. Furthermore, cooling conduits 27 may be provided in the mold 20 to cool melt contained in the mold cavity 20a to solidify the melt 22 therein to form a molded article.

As shown in FIG. 1, the melt conduit 29 includes at least one corner portion 48, which conveys melt 22 through a direction change. The direction change may be a 90 degree turn. Alternatively, it may be a smaller or greater angle based on the particular design criteria of the injection molding apparatus 10. The direction change may be gradual (eg. a long radius bend), or may be relatively quick (eg. a short radius bend). In the embodiment of the invention shown in FIG. 1, the corner portion 48 changes the direction of the melt flow towards the gate 24.

The runner 18 has an outlet portion 49 that extends from the corner portion to an outlet 53. The outlet portion 49 extends generally linearly between the corner portion 48 and the outlet 53. Also, the nozzle melt channel 30 may extend generally linearly and in alignment with the runner outlet 53.

The gating system 21 includes a valve pin 26 and may further include a valve pin actuator 31. The valve pin 26 may be fixedly or removably connected to the valve pin actuator 31 by any means known in the art.

The valve pin 26 is generally elongate and has a longitudinal axis A. The valve pin 26 enters the melt conduit 29 generally in the vicinity of the corner portion 48 and extends into the portion of the melt conduit 29 downstream from the corner portion 48.

The actuator 31 is configured to move the valve pin 26 between an open position, as shown in FIG. 1, to a closed position, as shown in FIG. 3. When the valve pin 26 is in the open position, melt 22 is permitted to flow through the gate 24 into the mold cavity 20a. The heaters 12a and 14a are operated as necessary to maintain the melt 22 at a selected temperature therein. Once the mold cavity 20a is filled and packed as desired, the valve pin 26 may be advanced to seal against and close the gate 20a, thereby closing the mold cavity 20a from further melt flow. A flow of coolant through the cooling conduits 27 may be initiated at any time to assist in cooling of the melt 22 in the mold cavity 20, thereby solidifying the melt 22 to form the molded article.

The actuator 31 may include, for example, a piston 32 and a chamber 34. The piston 32 may connect to the valve pin 26 in any suitable way and preferably releasably connects to the valve pin 26. To advance the valve pin 26 to the closed position, an actuation fluid, such as pressurized air, may be fed to a chamber portion 34a on a first side of the piston 32 via conduit 33a. Simultaneously, actuation fluid may be exhausted from the chamber portion 34b on a second side of the piston 32, via conduit 33b. The piston 32 and, in turn, the valve pin 26 are driven towards the gate 24 by the pressure difference across the piston 32. To move the valve pin 26 to the open position (FIG. 1), air from the chamber portion 34a is exhausted through conduit 33a, and pressurized air is fed into chamber 34b through conduit 33b.

The valve pin piston 32 may form a seal with the wall of the chamber 34 using piston seals 44, such as O-rings, to prevent leakage of any operating fluid from one side of the piston 32 to the other.

When the melt flow first encounters the valve pin 26 it is not parallel to the longitudinal axis of the valve pin 26. When the melt 22 flows around and along the valve pin 26 a stagnation zone 50 is created in a portion of the melt conduit 29 that is shielded by the valve pin 26 relative to the upstream melt flow. As a result of the low fluid pressure in the stagnation zone 50, melt 22 that enters it can remain there for extended periods even as melt 22 flows thereby through the melt conduit 29. As such, the stagnation zone 50 may also be referred to as a low pressure zone 50. The melt in the stagnation zone 50 is shown at 22a. Due to the presence of the valve pin 26, which shields the melt 22a in the stagnation zone 50, the melt 22a can be referred to as shielded melt 22a.

The melt 22a in the stagnation zone is said to stagnate in that it has relatively little mixing with the surrounding melt flow 22. However, the melt 22a in the stagnation zone 50 may itself move within the stagnation zone 50 by way of eddy currents and the like, for example.

As a result of remaining in the stagnation zone 50, the melt 22a may degrade over time. The degraded melt could then break loose and contaminate the melt flow into mold cavity 20a, ultimately negatively affecting the resulting molded article. However, even if the shielded melt 22a does not degrade, it can inadvertently remain in the stagnation zone 50 even after a cleanout of the injection molding apparatus 10 and can contaminate melt in a subsequent injection molding operation.

In FIGS. 1 to 3, a stagnation zone cleaner 38 is shown in section around the valve pin 26. The stagnation zone cleaner 38 is independently moveable relative to the valve pin 26 by means of a stagnation zone cleaner actuator 39. The stagnation zone cleaner actuator 39 may include, for example, a piston 40 and a chamber 43. The piston 40 may connect to the stagnation zone cleaner 38 in any suitable way and preferably releasably connects to the stagnation zone cleaner 38. To advance the stagnation zone cleaner 38 to a cleaning position (see FIG. 2), an actuation fluid, such as pressurized air, may be fed to a chamber portion 43a on a first side of the piston 40 via a conduit 41. The piston 40 is driven to the advanced position shown in FIG. 2. In turn, the piston drives the stagnation zone cleaner 38 through the stagnation zone 50, thereby pushing shielded melt 22a contained therein downwards out of the stagnation zone 50.

The stagnation zone cleaner piston 40 may form a seal with the wall of the chamber 43 using piston seals 44, such as O-rings, to prevent leakage of any operating fluid from one side of the piston 40 to the other.

By extending the stagnation zone cleaner 38 into the runner 18, as described above and as shown in FIG. 2, a leading edge surface 38a of the stagnation zone cleaner 38 urges melt 22 in the stagnation zone 50 out of the stagnation zone 50 and preferably urges the melt 22 downwardly towards the nozzle 14. Prior to retraction of the stagnation zone cleaner 38, the temperature of the melt 22 is lowered to increase the viscosity of the melt 22. For example, the melt temperature can be lowered by shutting off the heater 14a. The melt temperature can be further lowered by retracting the stagnation zone cleaner 38 during the molding phase of an injection molding cycle, when the mold is cooled to solidify melt 22 in the mold cavity 20a. Furthermore, the pressure of the melt 22 in the nozzle melt channel 30 is reduced. This may be accomplished by retracting the barrel feedscrew (not shown) that forms part of the melt source (not shown). By retracting the barrel screw, melt pressure in the runner 18 and nozzle melt channel 30 can be reduced. The reduced melt pressure, in combination with the increased viscosity of the melt 22 achieved by reducing the melt temperature, permits the stagnation zone cleaner 38 to be retracted without sucking the old shielded melt 22a back into the stagnation zone 50 with it.

After extending the stagnation zone cleaner 38 to push the shielded melt 22a from the stagnation zone 50, the stagnation zone cleaner 38 may be retracted. To retract the stagnation zone cleaner 38, the pneumatic pressure may be removed from the piston 40 to substantially remove any pneumatic force urging the stagnation zone cleaner 38 towards the advanced position. Any fluid pressure that exists in the portion 43b of the chamber 34 on a second side of the piston 40 will urge the piston 40 back to the position shown in FIG. 1. If springs 42 are provided, then they urge the stagnation zone cleaner 38 back to a retracted position. The stagnation zone cleaner 38 in turn urges the piston 40 back to the position shown in FIG. 1. In embodiments wherein the springs 42 are provided to urge the stagnation zone cleaner 38 to its retracted position, a void 51 (FIG. 3) is created in front of the leading edge surface 38a, ie. in the stagnation zone 50 during retraction of the stagnation zone cleaner 38.

After the stagnation zone cleaner 38 has retracted, the melt pressure in the melt conduit 29 is increased from a pressure increasing source that is upstream from the stagnation zone 50. This may be accomplished, for example, by advancing the barrel feedscrew (not shown). Furthermore, the melt temperature may be increased, eg. by reducing the flow of coolant through the mold plate coolant conduits 27, by operating the heater 14a, as a result of the increased melt pressure or by a suitable combination of the three. Once the melt pressure and temperature are sufficiently high to permit melt flow, the melt 22a will be urged to fill the void 51 left by the retraction of the stagnation zone cleaner 38. The melt 22a that will fill the void 51 will originate from upstream of the void 51.

In an alternative embodiment that is not shown, the springs 42 are not provided to retract the stagnation zone cleaner 38. In this alternative, the melt pressure, and optionally the melt temperature, are increased sufficiently from a position upstream of the stagnation zone 50 to urge melt 22 to flow towards the Slate 24. At this point, the pressure of the melt 22 will act on the leading edge surface 38a of the stagnation zone cleaner 38 and urge the stagnation zone cleaner 38 back to its retracted position. Melt 22 from upstream of the stagnation zone 50 fills the space vacated by the stagnation zone cleaner 38 as it retracts.

The leading edge surface 38a is inclined so that it presents a surface area to the melt flow immediately upstream thereof, thereby permitting melt pressure thereon from upstream to exert a force on the stagnation zone cleaner 38 that is translated into a force urging the stagnation zone cleaner 38 to retract. It is optionally possible for the stagnation zone cleaner 38 to include an actuating surface that is separate from the leading edge surface 38a, but is still configured to translate a force from an upstream melt flow to a force urging the stagnation zone cleaner 38 to retract.

In another alternative embodiment that is not shown, the actuator 39 may include means for controlling the flow of actuation fluid selectively on both sides of the piston 40 thereby permitting the piston 40 to be advanced or retracted. In this alternative, the piston 40 may be operatively connected to the stagnation zone cleaner 38 for both advancing and retracting movement. For example, the piston 40 may receive the stagnation zone cleaner 38 in a manner similar to the connection between the valve pin 26 and the piston 32. In this alternative embodiment, the piston 40 and in turn the stagnation zone cleaner 38 can be retracted by means of the actuation fluid.

After a selected period of time the new melt in the melt residue stagnation zone 50 can be moved back into the melt flow by the stagnation zone cleaner 38, to prevent the degradation of the new melt in the zone 50.

It will be appreciated that the stagnation zone cleaner 38 can be used to assist in removing any melt from the melt conduit 29 during a cleanout, eg. prior to a changeover to run the injection molding apparatus with a second melt. During a cleanout the melt conduit 29 may be flushed with a flushing material, which may be, for example, a "sacrificial" quantity of the second melt. The flushing material is run through the melt conduit to entrain at least some of any remaining first melt that is present in the melt conduit after the injection molding campaign with the first melt is complete. The flushing material carries the entrained first melt out of the melt conduit and may then be disposed or otherwise dealt with as desired. During flushing of the melt conduit, the stagnation zone cleaner 38 can be moved into the melt conduit to clean the melt residue stagnation zone 50 of residue from the first melt.

In the embodiment shown in FIGS. 1-3, the stagnation zone cleaner 38 includes an aperture 38b defined by an aperture wall 38c. The valve pin 26 passes through the aperture 38b into the melt conduit 29. The aperture wall 38c snugly engages the valve pin 26 to impede leakage of the melt 22 therebetween. However, despite this snug engagement of aperture wall 38c with the valve pin 26, aperture wall 38c cannot be sealed to valve pin 26 since valve pin 26 must be moveable relative to the stagnation zone cleaner 28 and is thus moveable relative to the aperture wall 38c. Accordingly, a sufficient clearance must be provided between the aperture wall 38c and the valve pin 26. During an injection molding campaign, there may be some leakage of melt 22 between the aperture wall 38c and the valve pin 26 due to the high pressure at which the melt 22 is forced through the runner 18. Once melt 22 leaks in, however, the melt 22 is not expected to escape back out into the melt conduit 29 during further operation. Accordingly, any melt 22 that leaks in may not represent a contamination problem after a changeover to a new melt.

Figure 4A:
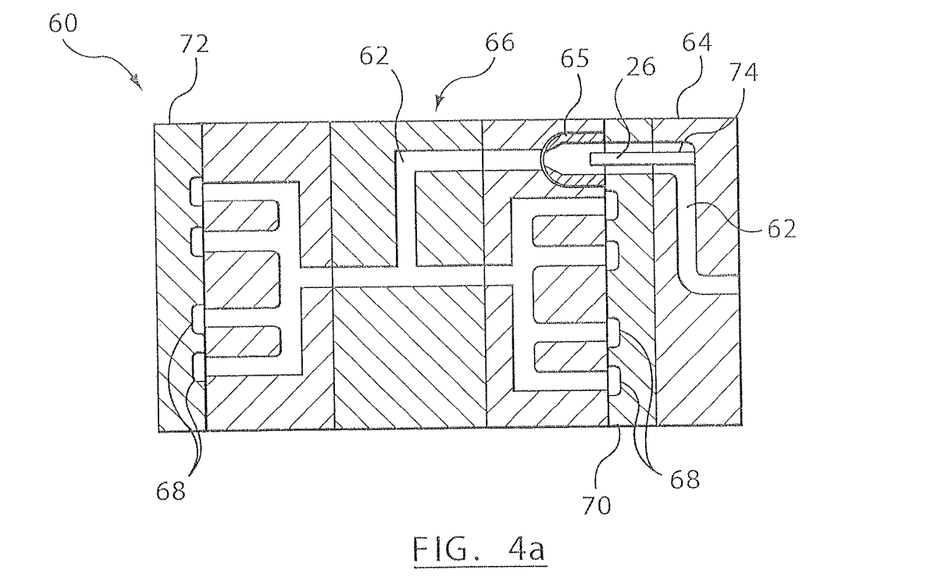
FIG. 4a is a side sectional view of a stack mold injection molding apparatus in accordance with another embodiment of the present invention, showing the components of the apparatus mated together.
Figure 4B:
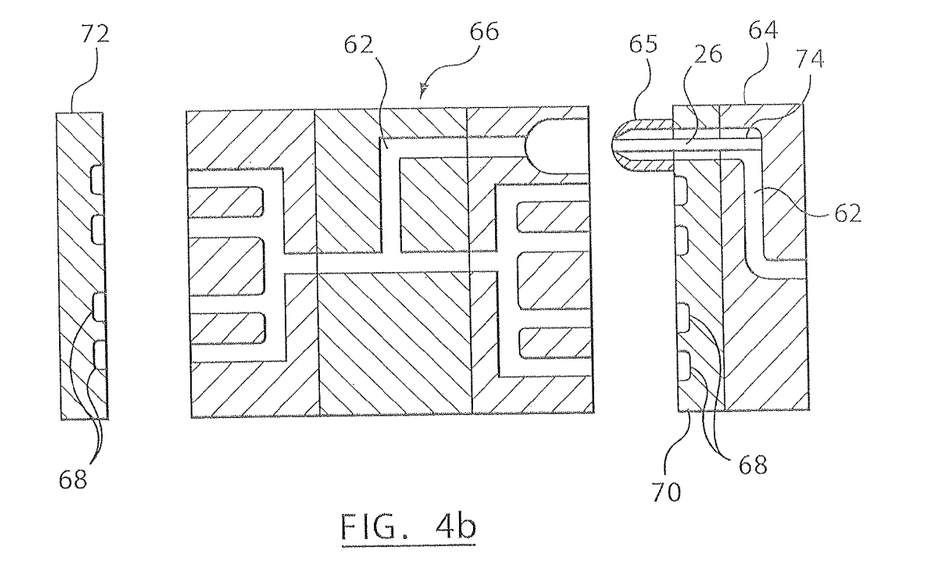
FIG. 4b is a side sectional view of the stack mold injection molding apparatus shown in FIG. 4a, showing the components of the apparatus separated for ejection of molded articles therefrom.

As another alternative, it is possible for the valve pin 26 to control melt flow at a position in the melt conduit 29 other than at the gate 24. For example, referring to FIGS. 4a and 4b, the valve pin 26 may be positioned in a stack mold injection molding apparatus 60. A melt conduit 62 extends from a melt source (not shown), through a stationary runner component 64, through a sprue bar assembly 65 and into a moveable runner component 66, which is a manifold. The moveable runner component 66 communicates with a first set of mold cavities 68 in a stationary mold block 70 and with a second set of mold cavities 68 in a moveable mold block 72. The valve pin 26 extends in the sprue bar assembly 65 between the stationary runner component 64 and the moveable runner component for controlling melt flow therein. Prior lo separation of the components 70, 66 and 72 (see FIG. 4*b*) for ejection of molded articles from the mold cavities 68, the valve pin 26 closes off the melt conduit 62 in the sprue bar assembly 65 to inhibit drool from occurring therefrom during ejection. In this embodiment, a stagnation zone 74 is present behind the valve pin 26 as shown in FIGS. 4*a* and 4*b*. The stagnation zone cleaner 38 is provided to clean the stagnation zone 74 in similar manner to the embodiment shown in FIGS. 1-3.

Figure 5:
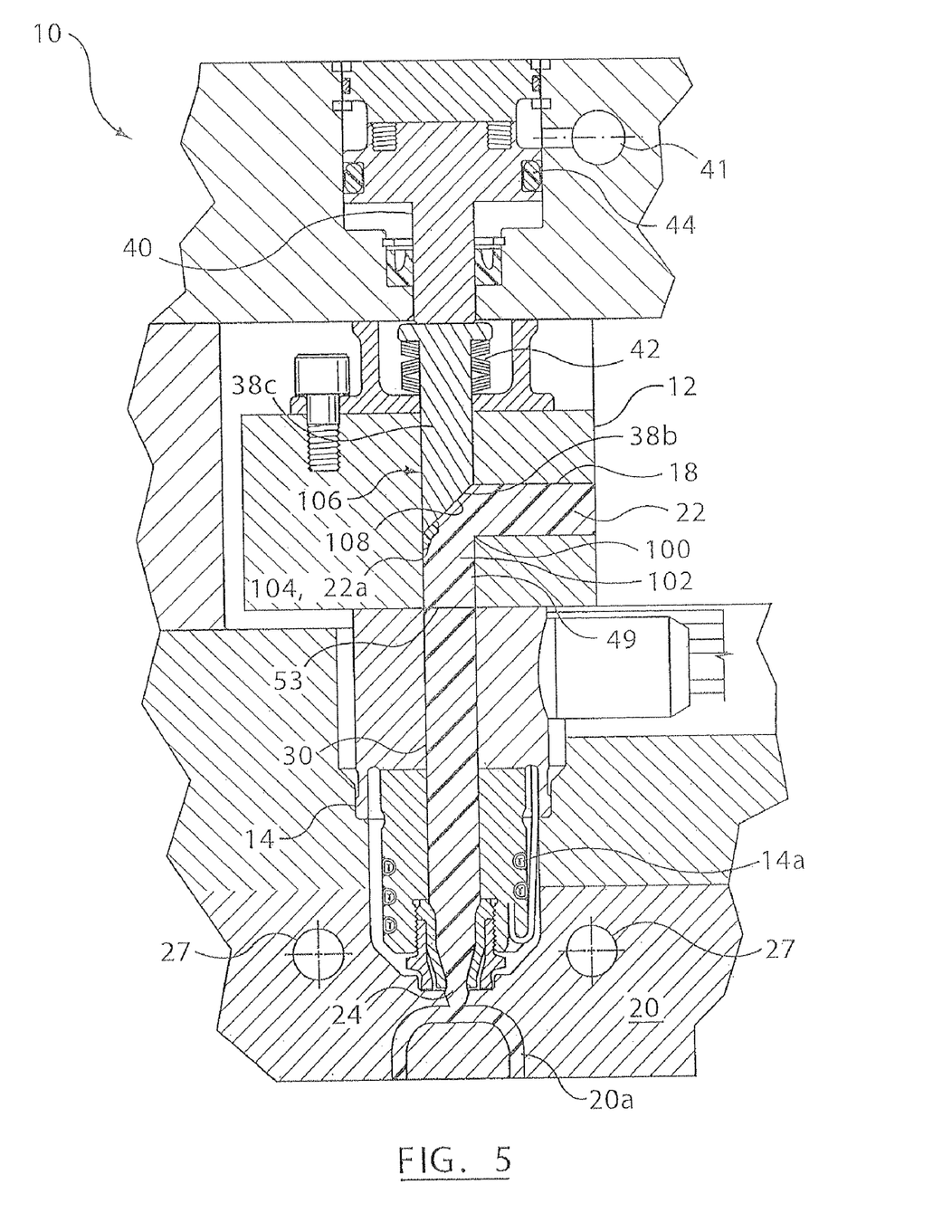
FIG. 5 is a side sectional view of a portion of an injection molding apparatus, in accordance with yet another embodiment of the present invention in which a stagnation zone cleaner is in a retracted position.

The embodiments described above have described a stagnation zone that is present behind a valve pin in a corner portion of a melt conduit. It is alternatively possible for a stagnation zone to be present at a corner portion of the melt conduit, as a result solely of the melt conduit configuration itself, without the presence of a valve pin. For example, referring to FIG. 5, a corner portion 100 of a melt conduit 102 may be provided, whereby the direction change of the melt 22 contained therein is relatively quick. For example, the corner portion 100 may have an unradiused 90 degree bend. In this case, the corner portion 100 comprises a stagnation zone 104 without the presence of a valve pin in the melt conduit. To clear shielded melt 22*a* out from the stagnation zone 104, a stagnation zone cleaner 106 may be provided to move into the melt conduit through the stagnation zone. Further, the stagnation zone cleaner 106 itself can be provided with a suitable configuration on its leading edge surface 108 to reduce the effect of the stagnation zone 104 even when the stagnation zone cleaner 106 is retracted as shown in FIG. 5.

The valve pin 26 has been described above as being moveable in the melt conduit between a closed position (FIG. 3) and an open position (FIG. 1). It is alternatively possible for the valve pin 26 to be fixedly connected in the melt conduit instead of being moveable therein. In this alternative, the stagnation zone cleaner 38 may be positioned around the valve pin 26 in similar manner to that shown in the figures.

In the embodiments shown in FIGS. 1-3, the stagnation zone cleaner 38 surrounds the valve pin 26, which passes therethrough. It is alternatively possible to have the stagnation zone cleaner 38 abut the valve pin 26, and to mate with the valve pin 26, by means of, for example, a hemi-cylindrical indent that forms part of the exterior surface of the cleaner 38 and that slidingly receives the valve pin 38.

Other variations and modifications of the invention are possible. All such modifications or variations are believed to be within the sphere and scope of the invention as defined by the claims appended hereto.

The invention claimed is:

1. An injection molding apparatus, comprising:
    a) a runner component, wherein a melt conduit is defined at least in part by the runner component, wherein the runner component is positionable downstream from a melt source and upstream from a gate into a mold cavity defined in a mold block, wherein the melt conduit has a stagnation zone therein;
    b) a valve pin extending into the melt conduit and movable to control melt flow from the melt cavity; and
    c) a stagnation zone cleaner, wherein the stagnation zone cleaner is moveable independently of the valve pin through the stagnation zone to urge melt out of the stagnation zone.

2. The injection molding apparatus as defined in claim 1, wherein the stagnation zone is at least partially shielded by the valve pin.

3. The injection molding apparatus as defined in claim 1, wherein the valve pin is moveable between an open position and a closed position, wherein when in the open position the valve pin is spaced from the gate to permit melt flow into the mold cavity and when in the closed position the valve pin blocks the gate to impede melt flow into the mold cavity, and the injection molding apparatus further comprises a valve pin actuator for moving the valve pin between the open position and the closed position.

4. The injection molding apparatus as defined in claim 1, wherein the stagnation zone is located in a corner portion of the melt conduit at which a flow of melt through the melt conduit changes directions.

5. The injection molding apparatus as defined in claim 4, wherein the melt conduit comprises an upstream portion upstream from the corner portion and extending in a first direction, and a downstream portion downstream from the corner portion and extending in a second direction different from the first direction; and the valve pin extends in the second direction into the downstream portion.

6. The injection molding apparatus as defined in claim 3, comprising a stagnation zone cleaner actuator for extending the stagnation zone cleaner in the melt conduit, wherein the stagnation zone cleaner actuator is operable independently of the valve pin actuator.

7. The injection molding apparatus as defined in claim 6, wherein the stagnation zone cleaner actuator comprises a pneumatically actuatable piston for advancing the stagnation zone cleaner into the melt conduit, and a spring for retracting the stagnation zone cleaner from the melt conduit.

8. The injection molding apparatus as defined in claim 6, wherein the stagnation zone cleaner has an actuation surface that is inclined for receiving a force from melt flow in the melt conduit and transferring the force into a retracting force for the stagnation zone cleaner.

9. The injection molding apparatus as defined in claim 1, wherein the stagnation zone cleaner has an aperture therethrough for slidably receiving the valve pin.

10. The injection molding apparatus as defined in claim 1, wherein the stagnation zone cleaner is slidably engageable with the valve pin.

11. The injection molding apparatus as defined in claim 1, wherein the melt conduit is defined in part in a stationary runner component, in part in a moveable runner component that is positioned downstream from the stationary runner component and in part in a sprue bar assembly between the stationary runner component and the moveable runner component.

12. The injection molding apparatus as defined in claim 1, wherein the stagnation zone cleaner is moveable through the stagnation zone to urge melt out of the stagnation zone downstream.

13. An injection molding apparatus, comprising:
    a) a manifold defining a plurality of runners, wherein the plurality of runners are in fluid communication with a manifold inlet, and wherein each of the runners has an outlet, and wherein the manifold is positionable so that the manifold inlet is downstream from a melt source, and wherein each runner includes a corner portion prior to each outlet, wherein the corner portion is configured to convey the melt through a non-zero angle, wherein each runner includes an outlet portion that extends generally linearly between the corner portion and the outlet;
    b) a plurality of nozzles, each nozzle including a nozzle melt channel, wherein each nozzle melt channel is positioned downstream from the outlet portion of one of the runners and upstream from a gate into a mold cavity defined in a mold block;

c) a plurality of gating systems, wherein each gating system includes a valve pin and a valve pin actuator, wherein each valve pin extends into the outlet portion of one of the runners and into the nozzle melt channel of one of the nozzles and wherein the valve pin is movable between an open position wherein the valve pin is spaced from the gate, and a closed position wherein the valve pin prevents melt flow to the mold cavity; and d) a plurality of stagnation zone cleaners, wherein each stagnation zone cleaner is movable independently of the valve pin, between a retracted position wherein the stagnation zone cleaner is retracted from the runner, and an advanced position wherein the stagnation zone cleaner extends into a portion of the runner shielded by the valve pin from melt flow upstream from the valve pin.

14. An injection molding apparatus as claimed in claim 13, wherein the corner portion is configured to convey the melt through an angle of approximately 90 degrees.

15. An injection molding apparatus as claimed in claim 13, wherein the stagnation zone cleaner at least partially surrounds the valve pin.

16. An injection molding apparatus as claimed in claim 13, wherein the stagnation includes an aperture therethrough, and wherein the valve pin is slidingly received in the aperture.

17. An injection molding apparatus as claimed in claim 13, wherein the nozzle melt channel extends generally linearly and is positioned in alignment with the outlet portion of one of the runners and upstream from a gate into a mold cavity defined in a mold block.

18. An injection molding apparatus as claimed in claim 13, wherein in the closed position the valve pin cooperates with the gate to prevent melt flow through the gate.

19. An injection molding apparatus according to claim 8 wherein the stagnation zone is located at a corner portion of the melt conduit where the melt flow changes direction, the inclined actuation surface being arranged to face melt flow entering the corner portion and direct the melt flow downstream.

20. An injection molding apparatus according to claim 1 wherein the stagnation zone is located at a corner portion of the melt conduit where the melt flow changes direction and the stagnation zone cleaner has an actuation surface that defines part of a flow path through the melt conduit at the corner portion.

21. An injection molding apparatus according to claim 20 wherein the stagnation zone cleaner is movable from a retracted position to an advanced cleaning position wherein in the advanced cleaning position the stagnation zone cleaner partially obstructs the flow path through the melt conduit at the corner portion.

22. An injection molding apparatus according to claim 20 wherein the actuation surface has an inclined surface facing melt flow entering the corner portion such that the melt flow passing through the corner portion applies a force for moving the stagnation zone cleaner towards its retracted position.

23. An injection molding apparatus, comprising:

a manifold defining a melt conduit having an inlet and an outlet, the melt conduit having a corner portion downstream of the inlet and upstream of the outlet relative to melt flow through the melt conduit, wherein the corner portion is changes a direction of melt flow through the melt conduit, a nozzle including a nozzle melt conduit positioned downstream from the outlet of the melt conduit and upstream from a gate into a mold cavity defined in a mold block;

a valve pin and a valve pin actuator, wherein the valve pin extends through the outlet of the melt conduit and into the nozzle melt conduit of one of the nozzle and wherein the valve pin is movable between an open position wherein the valve pin is spaced from the gate, and a closed position wherein the valve pin prevents melt flow to the mold cavity; and a stagnation zone cleaner and stagnation zone cleaner actuator, the stagnation zone cleaner being movable independently of the valve pin by the stagnation zone actuator between a retracted position and an advanced position in which the stagnation zone cleaner extends into a portion of the melt conduit for urging melt out of the corner portion of the melt conduit.

24. An injection molding apparatus according to claim 23 wherein the stagnation zone cleaner has an actuation surface that defines part of the melt conduit at the corner portion both when the stagnation zone cleaner is in the retracted position and the advanced position.

25. An injection molding apparatus according to claim 24 wherein the actuation surface is inclined such that melt flow flowing from the melt conduit inlet to the melt conduit outlet through the corner portion applies force on the actuation surface for biasing the stagnation zone cleaner from the advanced position to the retracted position.

26. An injection molding apparatus according to claim 25 wherein the actuation surface defines a central opening through which the valve pin passes.

* * * * *